(12) United States Patent
Castner

(10) Patent No.: US 7,217,775 B2
(45) Date of Patent: May 15, 2007

(54) EMULSION PARTICLES AS REINFORCING FILLERS

(75) Inventor: Eric Sean Castner, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/827,747

(22) Filed: Apr. 20, 2004

(65) Prior Publication Data

US 2004/0198917 A1   Oct. 7, 2004

Related U.S. Application Data

(62) Division of application No. 10/230,554, filed on Aug. 29, 2002, now Pat. No. 6,780,937.

(51) Int. Cl.
| | |
|---|---|
| C08F 36/00 | (2006.01) |
| C08F 118/02 | (2006.01) |
| C08F 122/10 | (2006.01) |
| C08F 136/00 | (2006.01) |
| C08F 220/68 | (2006.01) |
| C08F 236/00 | (2006.01) |

(52) U.S. Cl. .................. 526/318; 526/319; 526/326; 526/332; 526/335; 526/336; 526/340; 526/345

(58) Field of Classification Search ............... 526/318, 526/319, 326, 332, 335, 336, 340, 345
See application file for complete search history.

(56) References Cited

U.S. PATENT DOCUMENTS

| | | | |
|---|---|---|---|
| 3,962,197 A * | 6/1976 | Khanna | ............ 526/79 |
| 3,992,486 A | 11/1976 | Lang | |
| 4,611,039 A * | 9/1986 | Powell et al. | ............ 526/271 |
| 4,889,888 A | 12/1989 | Bassi et al. | |
| 5,395,891 A | 3/1995 | Obrecht et al. | |
| 6,127,488 A | 10/2000 | Obrecht et al. | |
| 6,133,364 A | 10/2000 | Obrecht et al. | |
| 6,184,296 B1 | 2/2001 | Obrecht et al. | |
| 6,207,757 B1 | 3/2001 | Obrecht et al. | |
| 6,242,534 B1 | 6/2001 | Obrecht et al. | |
| 6,372,857 B1 | 4/2002 | Obrecht et al. | |
| 6,399,706 B1 | 6/2002 | Obrecht et al. | |
| 6,583,082 B2 * | 6/2003 | Hoang et al. | ............ 502/109 |
| 6,627,325 B1 * | 9/2003 | Ghosal et al. | ............ 428/500 |
| 6,653,404 B2 | 11/2003 | Konno et al. | |
| 6,747,095 B2 | 6/2004 | Konno et al. | |
| 2001/0053813 A1 | 12/2001 | Konno et al. | |
| 2002/0007011 A1 | 1/2002 | Konno et al. | |

* cited by examiner

*Primary Examiner*—Nathan M. Nutter
(74) *Attorney, Agent, or Firm*—Brouse McDowell; Roger D. Emerson; Daniel J. Schlue

(57) ABSTRACT

A rubber composition having improved processability and which provides a vulcanized rubber exhibiting excellent wear resistance and good tensile strength to service temperatures of up to about 150° C. The composition comprises (1) a crosslinked polymer particle having as repeat units (a) up to about 25% of a conjugated diene unit, (b) at least 70% of an aromatic vinyl unit, (c) about 15% to about 30% of a crosslinking monomer, and (d) about 0.1 to about 30% of a monomer unit having one polymerizable unsaturated group and at least one functional group; and, (2) a non-crosslinked host polymer comprised of at least one member of the group consisting of a polymer having only conjugated diene repeat units, a polymer having repeat units of a conjugated diene unit and an aromatic vinyl unit, a polymer having repeat units of a conjugated diene unit and an α-β-unsaturated nitrile unit, an acrylic rubber, a polymer having repeat units of an ethylene unit, and polymers having repeat units having functional groups able to interact with a functional group of the functionalized monomer.

6 Claims, No Drawings

EMULSION PARTICLES AS REINFORCING FILLERS

This divisional patent application claims priority from a utility patent application having Ser. No. 10/230,554, which was filed on Aug. 29, 2002, now U.S. Pat. No. 6,780,937.

I. BACKGROUND OF THE INVENTION

Incorporation of particles as fillers in rubber compositions are well known. The fillers are chosen to enhance certain characteristics of the rubber composition. For example, fillers may be used to enhance stiffness, hardness, modulus and so on.

U.S. Pat. Nos. 5,395,891 and 6,127,488 to Obrecht disclose the use of crosslinked polybutadiene and crosslinked styrene-butadiene copolymers respectively as a type of filler. The benefits of the inclusion of these crosslinked polymer particles is lower hysteresis while the polybutadiene gels also impart improved abrasion resistance and the styrene-butadiene copolymer gels offer improve wet traction.

U.S. Pat. Nos. 6,133,364, 6,207,757, and 6,242,534 to Obrecht et al. discloses a rubber composition comprising a crosslinked elastomer particle and a non-crosslinked elastomer. The crosslinked elastomeric particles are functionalized to impart unique surface reactivity for improved coupling with the non-crosslinked host elastomer as well as the subsequent ability to employ coupling agents other than the conventional sulfur-bridged bis-alkoxy silanes. The benefits of the gels are reported to be lower hysteresis, improved abrasion resistance, and improved wet traction.

U.S. Patent Applications published as US 2002/0007011 and US 2001/0053813 to Konno et al. disclose a rubber composition comprising as essential components a crosslinked polymer particle and a non-crosslinked rubber component. The rubber composition may be used to obtain a vulcanized rubber. The crosslinked polymer particles are intended for use as a filler to provide a rubber composition having good processability and handling performance as well as improved tensile strength and wearing resistance when vulcanized. However, it has been found that the particles disclosed in the Kono et al. application tend to soften at higher service temperatures. The effectiveness of the particles as reinforcing fillers is therefore decreased.

II. SUMMARY OF THE INVENTION

When polymers are compounded, the interaction between molecules plays a significant role in dispersibility, processability, and other characteristics. Additionally, it has been demonstrated that when polymers of sufficiently different solubility parameters are compounded together the degree of immiscibility leads to an increase in the tangent delta at the $T_g$ of the component rubbers. In this way, it is possible to improve the wet traction of a polymer composite as indicated by tangent delta at a temperature of −10° C.

In the present invention, functional groups may be located on both the crosslinked particles and the host polymer. The purpose of functionalization in both the host polymer and the crosslinked particle is to improve the dispersion of the crosslinked particles while creating an interaction between the two materials so as to provide additional reinforcement.

The present invention capitalizes on the use of crosslinked polymer particles as reinforcing fillers that retain desirable physical properties at service temperatures of up to at least 150° C. The present invention further exploits the interaction between the functionality of the filler particles and the host polymer. Performance characteristics such as lower hysteresis, improved tread wear and improved wet traction are exhibited by the rubber composition of the present invention. Further, functionality at the surface of the crosslinked particles may be varied so as to tailor specific interactions with alternative coupling agents to achieve desired performance characteristics.

As noted above, benefits of the inclusion of crosslinked polymer particles is lower hysteresis, improved abrasion resistance and/or improved wet traction. In order to maximize the benefit of the gels, it is reasonable to assume that they must be either chemically or physically connected to the host elastomer. For this reason, the application of polyisoprene gels, for which isoprene cures more readily than butadiene, is an advantage in most host polymers.

Also, the polymeric crosslinked particles are by nature deformable and do not yield the high modulus that rigid fillers do. Therefore, crosslinked particles that are resinous would have the advantage of yielding higher modulus.

The present invention is directed to a rubber composition comprised of a crosslinked polymer particle and a non-crosslinked host polymer. The inventive rubber composition comprises about 10 to about 70 parts by weight of the crosslinked polymer particle and about 30 to about 90 parts by weight of the noncrosslinked host polymer.

More particularly, in accordance with the invention, the crosslinked polymer particle is comprised of repeat units which are comprised of (a) about 0% to about 25% by weight of a conjugated diene unit, (b) at least 70% to about 85% by weight of an aromatic vinyl unit, (c) about 15% to about 30% by weight of a crosslinking monomer unit, and (d) about 0.1% to about 30% by weight of a functionalized monomer unit having one polymerizable unsaturated group and at least one functional group wherein said functional group provides for improved interaction with the host polymer or selected coupling agent or augments the vulcanization of the material. The preferred functional groups are selected from the group consisting of an amino group, a hydroxyl group, an epoxy group, and a siloxane.

The crosslinked polymer particle is carried in a non-crosslinked host polymer wherein the non-crosslinked host polymer is at least one member selected from the group consisting of a polymer having only conjugated diene repeat units, a polymer having repeat units of a conjugated diene unit and an aromatic vinyl unit, a polymer having repeat units of a conjugated diene unit and an α-β-unsaturated nitrile unit, an acrylic rubber, a polymer having repeat units of an ethylene unit, and polymers having repeat units having functional groups able to interact with the at least one functional group of the crosslinked polymer particle.

If present in the crosslinked polymer particle, the conjugated diene unit is at least one member of the group consisting of 1,3-butadiene, 2,3-dimethyl-1,3-butadiene and isoprene.

In the crosslinked polymer particle, the aromatic vinyl unit is at least one member of the group consisting of styrene, 2-methylstyrene, 3-methylstyrene, 4-methylstyrene, α-methyl styrene, 2,4-dimethylstyrene, 2,4-diisopropylstyrene, 4-tert-butylstyrene and tert-butoxystyrene.

In the crosslinked polymer particle, the crosslinking monomer unit is at least one member of the group consisting of divinyl benzene, diisopropenylbenzene, divinylether, triallyl cyanurate, triallyl isocyanurate, 1,2-polybutadiene, ethyleneglycol dimethacrylate, propyleneglycol dimethacrylate, 1,4-butanediol dimethacrylate, 1,6-hexanediol dimethacrylate, trimethylolpropane dimethacrylate, trimethylolpropane trimethacrylate.

In the crosslinked polymer particle, the functionalized monomer unit comprises at least one member of the group consisting of an amino group, a hydroxyl group, an epoxy group, a carboxylic group and a siloxane group.

The invention discloses a rubber composition comprising a crosslinked polymer particle wherein the particle size is not greater than about 1000 nm.

The invention further discloses a rubber composition comprising a crosslinked polymer particle wherein the crosslinked polymer particle has a predetermined $T_g$ such that the crosslinked polymer particle does not soften at service temperatures up to about 150° C.

In accordance with the invention, there is provided a crosslinked polymer particle comprising repeat units which are comprised of (a) about 0% to about 25% by weight of a conjugated diene unit; (b) at least 70% to about 85% by weight of an aromatic vinyl unit; (c) about 15% to about 30% by weight of a crosslinking monomer; and, (d) about 0.1 to about 30% by weight of a functionalized monomer unit having one polymerizable unsaturated group and at least one functional group.

The invention further discloses a rubber composition comprising (1) from about 10 to about 70 parts by weight of a crosslinked polymer particle which is comprised of as repeat units which are comprised of: (a) up to about 25% by weight of a conjugated diene unit, (b) at least 70% by weight of an aromatic vinyl unit, (c) at least 15% by weight of a crosslinking monomer, and (d) about 0.1 to about 30% by weight of a functionalized monomer unit having one polymerizable unsaturated group and at least one functional group; and, (2) from about 30 to about 90 parts by weight of a non-crosslinked host polymer wherein the non-crosslinked host polymer is at least one member selected from the group consisting of a polymer having only conjugated diene repeating units, a polymer having repeating units of a conjugated diene unit and an aromatic vinyl unit, a polymer having repeating units of a conjugated diene unit and an α-β-unsaturated nitrile unit, an acrylic rubber, a polymer having repeat units of an ethylene unit, and polymers having repeating units having functional groups able to interact with a functional group of the functionalized monomer.

The invention further discloses a rubber composition comprising 1) from about 10 to about 70 parts by weight of a crosslinked polymer particle comprising polyisoprene; and, 2) from about 30 to about 90 parts by weight of a non-crosslinked host polymer wherein the non-crosslinked host polymer is at least one member selected from the group consisting of a polymer having only conjugated diene repeat units, a polymer having repeat units of a conjugated diene unit and an α-β-unsaturated nitrile unit, an acrylic rubber, and a polymer having repeat units of an ethylene unit.

III. DETAILED DESCRIPTION OF THE INVENTION

In the description of the invention, any reference to "$T_g$" refers to a "glass transition temperature." A preferred method of measuring the $T_g$ is by using a differential scanning calorimeter at a heating rate of 10° C. per minute.

The term "functionalization" refers to the presence of certain polar functional groups, preferably amino groups, hydroxyl groups, epoxy groups, or siloxane groups. The functional groups originate in functionalized monomers and are carried on the polymeric backbone of either the reinforcing filler as described herein, or on the host polymer, or both.

A "repeat unit" has its origins in a given monomer and is present in a polymeric molecule after polymerization.

The term "interaction" as used herein refers to ionic-, covalent-, or hydrogen-bonding occurring in the processes of the present invention.

Reference to "host polymer" includes a polymeric matrix or polymer blend.

The present invention is directed to a rubber composition comprised of from about 10 to 70 parts by weight of a crosslinked polymer particle and from about 30 to about 90 parts by weight of a noncrosslinked host polymer. In the preferred embodiment, the rubber composition is comprised of about 10 to about 50 parts by weight of the crosslinked polymer particle. In a more preferred embodiment, the rubber composition is comprised of about 10 to about 30 parts by weight of the crosslinked polymer particle.

In the preferred embodiment, the crosslinked polymer particle is comprised of repeat units which are comprised of (a) about 0% to about 25% by weight of a conjugated diene unit, (b) at least 70% to about 85% by weight of an aromatic vinyl unit, (c) about 15% to about 30% by weight of a crosslinking monomer unit, and (d) about 0.1% to about 30% by weight of a functionalized monomer unit having one polymerizable unsaturated group and at least one functional group. In the preferred embodiment, the at least one functional group is selected from the group consisting of an amino group, a hydroxyl group, an epoxy group, and a siloxane.

The crosslinked polymer particle is carried in a non-crosslinked host polymer wherein the non-crosslinked host polymer is at least one member selected from the group consisting of a polymer having only conjugated diene repeat units, a polymer having repeat units of a conjugated diene unit and an aromatic vinyl unit, a polymer having repeat units of a conjugated diene unit and an α-β-unsaturated nitrile unit, an acrylic rubber, a polymer having repeat units of an ethylene unit, and polymers having repeat units having functional groups able to interact with at least one functional group of the crosslinked polymer particle.

In accordance with the invention, in the preferred embodiment, in the crosslinked polymer particle, the conjugated diene unit may be formed from at least one member of the group consisting of 1,3-butadiene, 2,3-dimethyl-1,3-butadiene, and isoprene; the aromatic vinyl unit may be formed from at least one member of the group consisting of styrene, 2-methylstyrene, 3-methylstyrene, 4-methylstyrene, α-methyl styrene, 2,4-dimethylstyrene, 2,4-diisopropylstyrene, 4-tert-butylstyrene, and tert-butoxystyrene; the crosslinking monomer unit may be formed from at least one member of the group consisting of divinyl benzene, diisopropenylbenzene, divinylether, triallyl cyanurate, triallyl isocyanurate, 1,2-polybutadiene, ethyleneglycol dimethacrylate, propyleneglycol dimethacryl ate, 1,4-butanediol dimethacrylate, 1,6-hexanediol dimethacrylate, trimethylolpropane dimethacrylate, trimethylolpropane trimethacrylate; and the functionalized monomer unit may comprise at least one member of the group consisting of an amino group, a hydroxyl group, an epoxy group, a carboxylic group and a siloxane group.

In the present invention, the crosslinked polymer particle could potentially be produced separately as a reinforcing filler or as a masterbatch with emulsion rubber that would lower the density of the compound, maintain rolling resistance, improve wear, and improve wet traction.

Further, in accordance with the present invention, resinous crosslinked polymer particles exhibiting high $T_g$ may provide serviceability of the invention up to about 150° C.

Polar functionalization of higher $T_g$ emulsion gel particles (elastomer or resin) offers the ability to decrease the compatibility between the host polymer or blend and the reinforcing particles, thereby increasing the tangent delta (tan δ) at low temperatures and increasing wet traction. Utilizing the chemistry occurring at the surface of the particles, new coupling agents could be employed to impart desired characteristics to a vulcanized rubber formed from the inventive rubber composition.

In the preferred embodiment, the crosslinked polymer particle has a particle size of 1000 nm or less, more preferably 500 nm or less and most preferably about 100 nm to about 240 nm. It is contemplated that a particle size as low as about 40 nm will still provide the advantages of the present invention.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE I

Preparation of Crosslinked Particles
(Resins and Gels)

A. Resin 1 (10% Methacrylic Acid, 88% Styrene, 2% DVB)

Resin 1 is a crosslinked particle functionalized by methacrylic acid with the expectation of having a high degree of interaction with uncrosslinked hydroxy functionalized polymers. The interaction between polymer and resin should produce improved compounded properties.

A two gallon reactor was first evacuated for 30 minutes. A soap solution composed of 7.29 lbs of reverse osmosis (RO) water, 7.2 g tripotassium phosphate, 532 g of a 10% solution of C14-18 unsaturated fatty acid potassium salt, 139.5 g of a 20% solution of the potassium salt of disproportionated rosin acid, 8.1 g of a 47.5% active dispersion of sodium naphthalenesulfonate-formaldehyde, and 0.85 g of a 40% active sodium C14–16 alpha-olefin sulfonate was charged to the reactor equipped with 2 axial flow turbines set at 120 rpm. The pH of the soap solution was adjusted to 10.5–11.0 with a 10% potassium hydroxide solution.

To the reactor was added 81 g of an activator solution composed of 80 g RO water, 0.75 g hydroxymethanesulfinic acid monosodium salt dihydrate, and 0.25 g ethylendiaminetetraacetic acid, ferric sodium complex.

The monomers were then added to the reactor. These included 1760 g styrene, 40 g of 55% divinyl benzene, and 200 g methacrylic acid. When the contents of the reactor reached 50 F., 518 g of a 44% active pinane hydroperoxide was added. The reaction was allowed to proceed until the solids content reached a plateau. At the completion of polymerization, a short-stop solution of 113 g RO water and 4.6 g of a 15% active isopropyl hydroxylamine was added.

B. Resin 2 (10% HPMA, 88% Styrene, 2% DVB)

Resin 2 is a crosslinked particle functionalized by hydroxypropyl methacrylate with the expectation of having a high degree of interaction with uncrosslinked carboxylic acid functionalized polymers. The interaction between polymer and resin should produce improved compounded properties. The same procedure and recipe as for Resin 1 was employed except that hydroxypropyl methacrylate was substituted for the methacrylic acid charge at the same charge weight.

C. Resin 3 (10% Itaconic Acid, 88% Styrene, 2% DVB)

Resin 3 is a crosslinked particle functionalized by itaconic acid with the expectation of having a high degree of interaction with uncrosslinked hydroxy functionalized polymers. In addition to an expected improvement in compounded properties, the itaconic acid has a higher degree of acid character at the same charge weight. The same procedure and recipe as for Resin 1 was employed except that itaconic acid was substituted for the methacrylic acid charge at the same charge weight.

D. Gel 1 (98% Butadiene, 2% DVB)

Gel 1 is present as a comparative example. Except for the monomer charge, the same procedure and recipe as for Resin 1 was employed. Gel 1 had a monomer charge of 1960 g of butadiene and 40 g of 55% active divinyl benzene.

E. Gel 2 (98% Isoprene, 2% DVB)

Gel 2 is present as a comparative example. Except for the monomer charge, the same procedure and recipe as for Resin 1 was employed. Gel 2 had a monomer charge of 1960 g of isoprene and 40 g of 55% active divinyl benzene.

EXAMPLE 2

Preparation of Host Polymer

A. Polymer 1 (47 wt % Styrene ESBR)

Polymer 1 is a standard unfunctionalized polymer and is present as the control. The polymer was synthesized in a two gallon reactor which was first evacuated for 30 minutes. A soap solution composed of 7.29 lbs of reverse osmosis (RO) water, 7.2 g tripotassium phosphate, 532 g of a 10% solution of C14–18 unsaturated fatty acid potassium salt, 139.5 g of a 20% solution of the potassium salt of disproportionated rosin acid, 8.1 g of a 47.5% active dispersion of sodium naphthalenesulfonate-formaldehyde, and 0.85 g of a 40% active sodium C14–16 alpha-olefin sulfonate was charged to the reactor equipped with 2 axial flow turbines set at 120 rpm. The pH of the soap solution was adjusted to 10.5–11.0 with a 10% potassium hydroxide solution.

To the reactor was added 81 g of an activator solution composed of 80 g RO water, 0.75 g hydroxymethanesulfinic acid monosodium salt dihydrate, and 0.25 g ethylendiaminetetraacetic acid, ferric sodium complex.

The monomers and chain transfer agent were then added to the reactor. These included 940 g styrene, 4.4 g t-dodecyl mercaptan, and 1060 g 1,3-butadiene. When the contents of the reactor reached 50° F., 518 g of a 44% active pinane hydroperoxide was added. The reaction was allowed to proceed until the solids content reached 23.5%. At this point, a short-stop solution of 113 g RO water and 4.6 g of a 15% active isopropyl hydroxylamine was added.

The short-stopped latex was then vented to allow the residual butadiene to escape. After venting, 1 L portions of the latex was transferred to a Buchi Rotovapor R-153 where 1 L RO water was added and subsequently stripped off of the latex in order to remove residual styrene.

B. Polymer 2 (3% HPMA, 47 wt % Styrene ESBR)

Polymer 2 is a hydroxy-functionalized form of the control ESBR polymer and is included for an expected interaction with carboxylic acid-functionalized resins. The same procedure and recipe as for Polymer 1 was employed except for the addition of 60 g hydroxypropyl methacrylate and the reduction of the styrene charge to 910 g and the butadiene charge to 1030 g.

C. Polymer 3 (3% Methacrylic Acid, 47 wt % Styrene ESBR)

Polymer 3 is a methacrylic acid-functionalized form of the control ESBR polymer and is included for an expected interaction with hydroxy-functionalized resins. The same procedure and recipe as for Polymer 2 was employed with the exception of 60 g methacrylic acid being added in place of the hydroxypropyl methacrylate.

D. Polymer 4 (3% Itaconic Acid, 47 wt % Styrene ESBR)

Polymer 4 is an itaconic acid-functionalized form of the control ESBR polymer and is included for an expected interaction with hydroxy-functionalized resins exceeding that of methacrylic acid. The same procedure and recipe as for Polymer 2 was employed with the exception of 60 g itaconic acid being added in place of the hydroxypropyl methacrylate.

PREPARATION OF EXAMPLES

Comparative Example 1 (Resin 1, Polymer 2)

Based on the final solids of the latexes, Resin 1 was blended with Polymer 1 in a ratio so as to yield a final composition of 30 wt % Resin 1 and 70 wt % Polymer 2. The coagulation and isolation of the blend was performed by first adding 12 g of a 40% active Winstay-C emulsion and 12 g of a 60% Polyguard emulsion to 2500 g of the blend for oxidative stability. A coagulation solution was prepared by adding 50 g NaCl and 5 g polyamine to 20 lbs RO water. The pH of the solution was lowered to between 3 and 4 with a 10% sulfuric acid solution. The latex was slowly added to the coagulation solution under rapid stirring. During the addition of latex, the pH was maintained between 3 and 4. After coagulation the crumb polymer was washed 3 times with RO water and placed in a 150 F. oven for 18 hours to dry.

Comparative Examples 2–13

All of the examples followed the same procedure for isolation and drying. The composition and weight fractions of the components of the blends are listed below.

Evaluation of Rubber Compositions

| Loading | Material |
|---|---|
| | Mixing Recipe |
| | Non-productive Mix |
| 100 phr | Resin/polymer blend |
| 3 phr | Zinc oxide |
| 1 phr | Steric acid |
| | Productive Mix |
| 1.75 phr | Sulfur |
| 1.0 phr | Santocure NS TBBS accelerator |

Mixing Protocol

Mixing of the resin/polymer blends was accomplished in two stages. The first stage (Non-productive) involved adding half of the resin/polymer blend to a 55 cc Haake Rheomix 90 equipped with a throat, with all the temperature control zones set at 140° C., Banbury rotors, and a mixing rate of 50 rpm. After the first half of the blend is added to the mixer the other ingredients of the Non-productive are added. As soon as the Non-productive ingredients were added, the second half of the blend was added in order to clear the throat of any remaining material. The ram was lowered and the material was mixed for 6 minutes ensuring that the temperature did not exceed 160° C.

The productive mix was run under the same conditions except for the temperature zones of the mixer which were controlled at 95° C. One-half of the mixed Non-productive material was added to the mixer followed by the productive ingredients, and the second half of the Non-productive. The ram was lowered and the material was mixed for 3 minutes with the temperature not to exceed 115° C.

After the Productive mix was completed, the samples were passed six times endwise through a mill set at 0.032 in. in order to create a sheet.

| Example | Crosslinked Particle/Polymer | Description of Blends | Purpose |
|---|---|---|---|
| 1 | Resin 1/Polymer 2 | 10/90 MA Resin & HPMA Polymer | Increase in resin to |
| 2 | Resin 1/Polymer 2 | 20/80 MA Resin & HPMA Polymer | demonstrate increase |
| 3 | Resin 1/Polymer 2 | 30/70 MA Resin & HPMA Polymer | in properties |
| 4 | Gel 2/Polymer 1 | 30/70 PI Gel & ESBR Polymer | Comparative example |
| 5 | Gel 1/Polymer 1 | 30/70 PBd Gel & ESBR Polymer | Comparative example |
| 6 | Resin 1/Polymer 1 | 30/70 MA Resin & ESBR Polymer | Negative control: functionalized resin w/unfunctionalized polymer |
| 7 | Resin 3/Polymer 1 | 30/70 Itaconic Resin & ESBR Polymer | Negative control: functionalized resin w/unfunctionalized polymer |
| 8 | Resin 3/Polymer 2 | 30/70 Itaconic resin & HPMA rubber | Expected positive control: carboxylic acid-functionalized resin with hydroxy-functionalized polymer |
| 9 | Resin 3/Polymer 4 | 30/70 Itaconic resin & Itaconic rubber | Investigation: carboxylic acid-functionalized resin with carboxylic acid-functionalized polymer |
| 10 | Resin 2/Polymer 4 | 30/70 HPMA resin & Itaconic rubber | Expected positive control: hydroxy-functionalized resin with carboxylic acid-functionalized polymer |
| 11 | Resin 1/Polymer 2/Polymer 1 | 30/50/20 MA Resin, HPMA Polymer, ESBR Polymer | Effect of dilution of the functionalized polymer with unfunctionalized ESBR |
| 12 | Resin 1/Polymer 2/Polymer 1 | 30/30/40 MA Resin, HPMA Polymer, ESBR Polymer | |
| 13 | Resin 1/Polymer 2/Polymer 1 | 30/10/60 MA Resin, HPMA Polymer, ESBR Polymer | |

Rheometer: ASTM D2084

A specimen of compounded rubber was sheeted out on a two-roll mill to insure it was as free of air as possible. The material was then allowed to come to room temperature before a test specimen was taken from the sample. The specimens were approximately 1.2 in in diameter and 0.45 in thickness, or equivalent to a volume of 9 cm$^3$. The specimen was inserted into the ODR and the cavity maintained at 135° C. From the rheometer curve the $tc_1$, $tc_{90}$, $ts_1$, maximum torque (MH) and the minimum torque (ML) are obtained.

Instron Testing:

A flat sheet was prepared between 1.5 mm and 3.0 mm thick by compression molding and curing in a 4"×6" sheet according to rheometer data. The test sheet provided 5 Die C tensile specimens. An Instron 5500R was employed for the tests. The jaw separation speed was set at 500 mm/min. The thickness of the specimens were gauged at three different places. The mean of the three measurements was used as the thickness in calculating the cross sectional area. The tensile specimens were aged for minimum of 16 hours after cure before testing. The dumbbell specimens were marked equidistant from the center and perpendicular to the longitudinal axis. A minimum of three samples was tested for each compound. From the tensile test the following data is obtained: 100% modulus, 200% modulus, tensile strength, and elongation at break.

Hardness

A hand-held Durometer, Type A, was employed for the hardness measurements. Testing was made on the cured sheets used for tensile specimens. The samples were aged for a minimum of 16 hours following cure before testing. Three readings were recorded and the mean of these reported.

RPA

The compounds were milled to provide a sheet of the material. Approximately 5 g of the compound was cut from the sheet. Each sample should weigh 5.1+/−0.1 g. The test is divided up into four subtests. The first subtest was conducted at 100° C. with a 2% strain deformation and at 0.333 Hz and 3.33 Hz. The second subtest was also made at 100° C. and employed a 15% strain at 0.833 and 8.33 Hz. The third subtest is a cure at 191° C. for a run time of 4.88 minutes. The cure curve is generated for a strain of 3.5% at a frequency of 1.667 Hz. Subtest 4 is a strain sweep (1.0%, 5.0%, 10.0%, 15.0%, 50.0) at 100° C./ and 1.0 Hz.

TABLE 1

Influence of MA Resin Level on HPMA Polymer

| Ingredient - BX58J20 | 1 | 2 | 3 | 4 | 5 |
|---|---|---|---|---|---|
| Resin (10% functional) | 10 wt % MA | 20 wt % MA | 30 wt % MA | 30 wt % PI gel | 30 wt % PBD gel |
| Functional Polymer (3% functional) | 90 wt % HPMA | 80 wt % HPMA | 70 wt % HPMA | | |
| Polymer | | | | 70 wt % ESBR | 70 wt % ESBR |
| Rheometer - ODR @ 170 C | | | | | |
| tc 50 | 13.8 | 21 | 22.3 | 10 | 11.5 |
| tc 90 | 20.2 | 36.8 | 42 | 13.1 | 14.9 |
| ts 1 | 7.9 | 7.5 | 9 | 7 | 7.8 |
| Max Torque (MH) | 20.4 | 19.5 | 18.6 | 27.2 | 29 |
| Min Torque (ML) | 4.3 | 5.1 | 5.7 | 4.8 | 4.8 |
| Original Physical Properties | | | | | |
| 100% Modulus, psi | 505 | 815 | 1134 | 136 | 146 |
| 200% Modulus, psi | 882 | 1163 | 1440 | 197 | 199 |
| Tensile, psi | 1300 | 1404 | 1596 | 287 | 270 |
| Elongation @ break, % | 301 | 307 | 302 | 302 | 309 |
| Hardness RT | 77 | 90 | 98 | 50 | 52 |
| MS/250 F | | | | | |
| Initial Torque | 68.3 | 71 | 72 | 35.6 | 44 |
| Minimum Torque @ 20 min. | 27 | 33 | 44 | 17 | 18.5 |
| RPA - 505 | | | | | |
| G' @ .833 Hz. (15% Strain)-kPa | 234.1 | 297.5 | 342.3 | 139.8 | 153.4 |
| G' @ 10% Strain (1 Hz.)-kPa | 1146.5 | 1793.1 | 2725.7 | 539.9 | 592.7 |
| Tan δ @ 10% Strain (1 Hz.) | 0.213 | 0.32 | 0.413 | 0.06 | 0.06 |
| Ratio G' @ 50%/G' @ 1%–10% Strain | 0.581 | 0.391 | 0.226 | 0.81 | 0.778 |

Table 1 provides a comparison of physical properties exhibited by Examples #1–#5. Table 1 illustrates the increase in reinforcement that is gained by increasing the content of the functionalized resin (10 wt % methacrylic acid/88 wt % styrene/2 wt % DVB) for functionalized polymer. For example, there is a linear increase in 100% modulus (505 psi, 815 psi, 1134 psi), 200% modulus (882 psi, 1163 psi, 1440psi), as well as a tensile increase (1300 psi, 1404 psi, 1596 psi) with resin loading. These results suggest that the resin particle is functioning as a filler. Contrary to expectation, increased resin loading did not sacrifice elongation at break. However, the samples did demonstrate a high low strain modulus (100% modulus). This increase modulus was not proportional for the higher strain (200%) modulus.

Generally these samples illustrate that the crosslinked polymer particle operates as a filler as evidenced by increased 100% modulus, 200% modulus, tensile strength, hardness and tan δ with increased resin loading.

TABLE 2

Comparison of Functionalized and Unfunctionalized Host Polymer

| Ingredient - BX58J20 | 3 | 6 | 7 | 4 | 5 |
|---|---|---|---|---|---|
| Resin (10% functional) | 30 wt % MA | 30 wt % MA | 30 wt % It Acid | 30 wt % PI gel | 30 wt % PBD gel |
| Functional Polymer (3% functional) | 70 wt % HPMA | | | | |
| Polymer | | 70 wt % ESBR | 70 wt % ESBR | 70 wt % ESBR | 70 wt % ESBR |
| Rheometer - ODR @ 170 C | | | | | |
| tc 50 | 22.3 | 22.9 | 15.4 | 10 | 11.5 |
| tc 90 | 42 | 47.6 | 19.1 | 13.1 | 14.9 |
| ts 1 | 9 | 5.8 | 6.8 | 7 | 7.8 |
| Max Torque (MH) | 18.6 | 23 | 28.5 | 27.2 | 29 |
| Min Torque (ML) | 5.7 | 4.7 | 4.3 | 4.8 | 4.8 |
| Original Physical Properties | | | | | |
| 100% Modulus, psi | 1134 | 591 | 373 | 136 | 146 |
| 200% Modulus, psi | 1440 | 889 | 760 | 197 | 199 |
| Tensile, psi | 1596 | 1173 | 1097 | 287 | 270 |
| Elongation @ break, % | 302 | 333 | 285 | 302 | 309 |
| Hardness RT | 98 | 83 | 69 | 50 | 52 |
| MS/250 F | | | | | |
| Initial Torque | 72 | 54.5 | 51.5 | 35.6 | 44 |
| Minimum Torque @ 20 min. | 44 | 26 | 18.5 | 17 | 18.5 |
| RPA - 505 | | | | | |
| G' @ .833 Hz. (15% Strain)-kPa | 342.3 | 232.4 | 157.6 | 139.8 | 153.4 |
| G' @ 10% Strain (1 Hz.)-kPa | 2725.7 | 1554.6 | 1168.4 | 539.9 | 592.7 |
| Tan δ @ 10% Strain (1 Hz.) | 0.413 | 0.193 | 0.084 | 0.06 | 0.06 |
| Ratio G' 50%/G' @ 1%–10% Strain | 0.226 | 0.385 | 0.643 | 0.81 | 0.778 |

Table 2 provides evidence that the reinforcement from the functionalized crosslinked polymer particle is in large part due to the interaction that it has with the corresponding functionalized host polymer. The benefits of co-functionalization is easily recognized by comparing examples #3, #6, and #7 with respect to the 100% modulus (1134 psi vs 591 psi and 373 psi), 200% modulus (1440 psi vs 889 and 760), and tensile strength (1596 psi vs 1173 and 1097) values. Unexpectedly, with the increase in modulus and tensile, the elongation at break is equivalent to those samples of lesser reinforcement. Further indication of reinforcement is the high initial torque of example #3. Initial torque is measured prior to cure. The values suggest that there is a mechanism present that is increasing the cohesiveness within the system (either polymer-to-polymer or polymer-to-crosslinked particle).

TABLE 3

Alternating Functionalization between Polymer and Resin

| Ingredient - BX58J20 | 8 | 9 | 10 |
|---|---|---|---|
| Resin (10% functional) | 30 wt % It Acid | 30 wt % It Acid | 30 wt % HPMA |
| Functional Polymer (3% functional) | 70 wt % HPMA | 70 wt % It Acid | 70 wt % It Acid |
| Polymer | | | |
| Rheometer - ODR @ 170 C | | | |
| tc 50 | 16.7 | 18.6 | 14.2 |
| tc 90 | 21 | 25.5 | 18.3 |
| ts 1 | 7.6 | 10.8 | 10.1 |
| Max Torque (MH) | 26.8 | 23.6 | 20.5 |
| Min Torque (ML) | 5.4 | 7.6 | 7.1 |
| Original Physical Properties | | | |
| 100% Modulus, psi | 754 | 463 | 760 |
| 200% Modulus, psi | 1105 | 1340 | 1036 |
| Tensile, psi | 1199 | 1530 | 1080 |
| Elongation @ break, % | 234 | 217 | 218 |
| Hardness RT | 85 | 84 | 68 |
| MS/250F | | | |
| Initial Torque | 59.5 | 69.4 | 84.9 |
| Minimum Torque @ 20 min. | 28 | 34 | 33 |
| RPA - 505 | | | |
| G' @ .833 Hz. (15% Strain)-kPa | 293.9 | 303.5 | 306.4 |
| G' @ 10% Strain (1 Hz.)-kPa | 1877.4 | 1052.1 | 1037.7 |
| Tan δ @ 10% Strain (1 Hz.) | 0.232 | 0.112 | 0.356 |
| Ratio G' @ 50%/G' @ 1% Strain | 0.469 | 0.699 | 0.68 |

Table 3 illustrates the possible alternation of functionality between the host polymer and the crosslinked polymer particle. The results show that the itaconic acid-functionalized particle does not provide the same level of interaction with the HPMA-functionalized polymer as does the methacrylic acid-functionalized particle. Additionally, the alternate placement of functionality (itaconic acid host polymer with HPMA-functionalized particle) did not provide any improved performance. It could be concluded that there is little or no interaction between itaconic acid and HPMA regardless of its location in the polymer-particle system. However, the placement of itaconic acid functionality on both the crosslinked polymer particle and the host polymer provided interesting performance. The lower strain modulus (100%) was much lower (463 psi vs 1134 psi) than that of the HPMA-polymer and MA-particle while the higher strain modulus (200%) and tensile were nearly equal (1596 psi vs 1530 psi and 1440 psi vs 1340 psi). The dual itaconic acid system had the greater advantages of lower hardness, lower minimum torque, lower tan δ, and higher G' @ 50%/G' @ 1% ratio. The single drawback to this system is the lower elongation.

gated diene unit and an aromatic vinyl unit, a polymer having repeating units of a conjugated diene unit and an α-β-unsaturated nitrile unit, an acrylic rubber and a polymer having repeating units of an ethylene unit.

In a preferred embodiment, the crosslinked polymer particle is comprised of (a) about 50% to about 99% by weight of isoprene and (b) at least 1% to about 20% by weight of a crosslinking monomer unit, and (d) about 0.1% to about 30% by weight of a functionalized monomer unit having one

TABLE 4

Dilution of HPMA Functionalized Polymer with ESBR

| Ingredient - BX58J20 | 3 | 11 | 12 | 13 | 6 |
|---|---|---|---|---|---|
| Resin (10% functional) | 30 wt % MA | 30 wt % MA | 30 wt % MA | 30 wt % MA | 30 wt % MA |
| Functional Polymer (3% functional) | 70 wt % HPMA | 50 wt % HPMA | 30 wt % HPMA | 10 wt % HPMA | |
| Polymer | | 20 wt % ESBR | 40 wt % ESBR | 60 wt % ESBR | 70 wt % ESBR |
| Rheometer - ODR @ 170 C | | | | | |
| tc 50 | 22.3 | 22.2 | 23 | 21.8 | 14.9 |
| tc 90 | 42 | 45 | 45.3 | 44 | 27.15 |
| ts 1 | 9 | 4.3 | 4.2 | 3.3 | 5.5 |
| Max Torque (MH) | 18.6 | 21 | 20.9 | 20 | 15.8 |
| Min Torque (ML) | 5.7 | 5 | 5.1 | 4.1 | 5 |
| Original Physical Properties | | | | | |
| 100% Modulus, psi | 1134 | 947 | 737 | 497 | 474 |
| 200% Modulus, psi | 1440 | 1234 | 1076 | 761 | 804 |
| Tensile, psi | 1596 | 1524 | 1626 | 1316 | 1508 |
| Elongation @ break, % | 302 | 370 | 442 | 514 | 472 |
| Hardness RT | 98 | 93 | 89 | 82 | 79 |
| RPA - 505 | | | | | |
| G' @ .833 Hz. (15% Strain)-kPa | 342.3 | 310.65 | 264.74 | 224.2 | 230.2 |
| G' @ 10% Strain (1 Hz.)-kPa | 2725.7 | 2316.5 | 1794.2 | 1480 | 1380.7 |
| Tan δ @ 10% Strain (1 Hz.) | 0.413 | 0.325 | 0.265 | 0.208 | 0.193 |
| Ratio G' @ 50%/G' @ 1% Strain | 0.226 | 0.253 | 0.319 | 0.381 | 0.439 |

Table 4 illustrates the benefits of the combination of functionalized resin with functionalized elastomer. The examples shown here range from a 70 wt % loading of HPMA-functionalized host polymer with 30 wt % methacrylic acid-functionalized crosslinked polymer particle to a 70 wt % loading of the unfunctionalized PLF1502 ESBR. Of interest here is that the reinforcement of the system is maintained until the host polymer phase is largely unfunctionalized. Across this range, the 100% modulus decreases (1134 psi, 947 psi, 737 psi, 497, psi) as well as hardness (98, 93, 89, 82) while the elongation increases (302%, 370%, 442%, 514%). RPA data shows a decrease in tan δ while the G' @ 50%/G' @ 1% ratio increases (0.226, 0.253, 0.319, 0.381)—all indicating a reduction in the gradual reduction in reinforcement with the addition of unfunctionalized host polymer.

Yet another embodiment of the present invention is directed to a crosslinked polymer particle carried in a host polymer wherein the crosslinked polymer particle comprises polyisoprene.

In the preferred embodiment, the rubber composition includes from about 10 to about 70 parts by weight of a crosslinked polymer particle comprising polyisoprene; and, from about 30 to about 90 parts by weight of a non-crosslinked host polymer wherein the non-crosslinked host polymer is at least one member selected from the group consisting of a polymer having only conjugated diene repeating units, a polymer having repeat units of a conjugated diene unit and an aromatic vinyl unit, a polymer having repeating units of a conjugated diene unit and an α-β-unsaturated nitrile unit, an acrylic rubber and a polymer having repeating units of an ethylene unit.

In a preferred embodiment, the crosslinked polymer particle is comprised of (a) about 50% to about 99% by weight of isoprene and (b) at least 1% to about 20% by weight of a crosslinking monomer unit, and (d) about 0.1% to about 30% by weight of a functionalized monomer unit having one polymerizable unsaturated group and at least one functional group wherein said functional group provides for improved interaction with the host polymer or selected coupling agent or augments the vulcanization of the material.

The rubber compositions of the present invention may be utilized in products that desire increased reinforcement with less stiffness and weight increase than found with conventional fillers. Such products include tires, latex gloves, belts, hoses, and tubing.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which would be within the full-intended scope of the invention as defined by the following appended claims.

I claim:

1. A crosslinked polymer particle comprising repeat units which are comprised of:
  (a) a conjugated diene unit;
  (b) at least 70% to about 85% by weight of an aromatic vinyl unit;
  (c) about 15% to about 30% by weight of a crosslinking monomer; and, (d) about 0.1 to about 30% by weight of a functionalized monomer unit having one polymerizable unsaturated group and at least one functional group.

2. The crosslinked polymer particle as claimed in claim 1 wherein, the conjugated diene unit is at least one member of the group consisting of 1,3-butadiene, 2,3-dimethyl-1,3-butadiene, and isoprene.

3. The crosslinked polymer particle as claimed in claim 1 wherein the aromatic vinyl unit is at least one member of the group consisting of styrene, 2-methylstyrene, 3-methylstyrene, 4-methylstyrene, α-methyl styrene, 2,4-dimethylstyrene, 2,4-diisopropylstyrene, 4tert-butylstyrene, and tert-butoxystyrene.

4. The crosslinked polymer particle as claimed in claim 1 wherein the crosslinking monomer unit is at least one member of the group consisting of divinyl benzene, diisopropenylbenzene, divinylether, triallyl cyanurate, triallyl isocyanurate, 1,2-polybutadiene, ethyleneglycol dimethacrylate, propyleneglycol dimethacrylate, 1,4-butanediol dimethacrylate, 1,6-hexanediol dimethacrylate, trimethylolpropane dimethacrylate, trimethylolpropane trimethacrylate.

5. The crosslinked polymer particle as claimed in claim 1 wherein in the functionalized monomer unit comprises at least one member of the group consisting of an amino group, a hydroxyl group, an epoxy group, a carboxylic group and a siloxane group.

6. The crosslinked polymer particle of claim 1, wherein the conjugated diene unit is present in an amount up to about 25% by weight.

* * * * *